Figure 1:
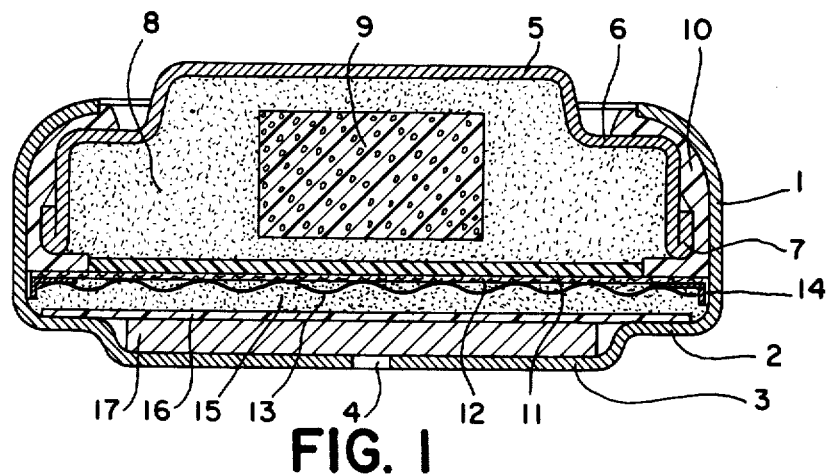

United States Patent [19]

Sauer et al.

[11] 4,054,726
[45] Oct. 18, 1977

[54] GALVANIC PRIMARY ELEMENT WITH AIR ELECTRODE

[75] Inventors: Hans Sauer, 6271 Idstein-Walsdorf; Dieter Spahrbier, 6239 Fischbach,Ts., both of Germany

[73] Assignee: Varta Batterie Aktiengesellschaft, Germany

[21] Appl. No.: 711,360

[22] Filed: Aug. 3, 1976

[30] Foreign Application Priority Data

Aug. 7, 1975 Germany .................... 2535269

[51] Int. Cl.² .................. H01M 4/02; H01M 4/06
[52] U.S. Cl. .................................... 429/66; 429/27
[58] Field of Search ....................... 429/12, 27, 66

[56] References Cited

U.S. PATENT DOCUMENTS

| 2,938,064 | 5/1960 | Kordesch | 429/27 |
| 3,697,326 | 10/1972 | Jammet | 429/27 |
| 3,855,000 | 12/1974 | Jammet | 429/27 |

*Primary Examiner*—John H. Mack
*Assistant Examiner*—H. A. Feeley
*Attorney, Agent, or Firm*—Weiser, Stapler & Spivak

[57] ABSTRACT

The negative zinc electrode of a primary element with alkaline electrolyte and hydrophobic air electrode has a compressible expansion body positioned within the negative electrode.

16 Claims, 6 Drawing Figures

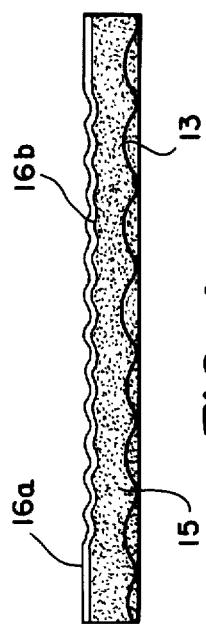
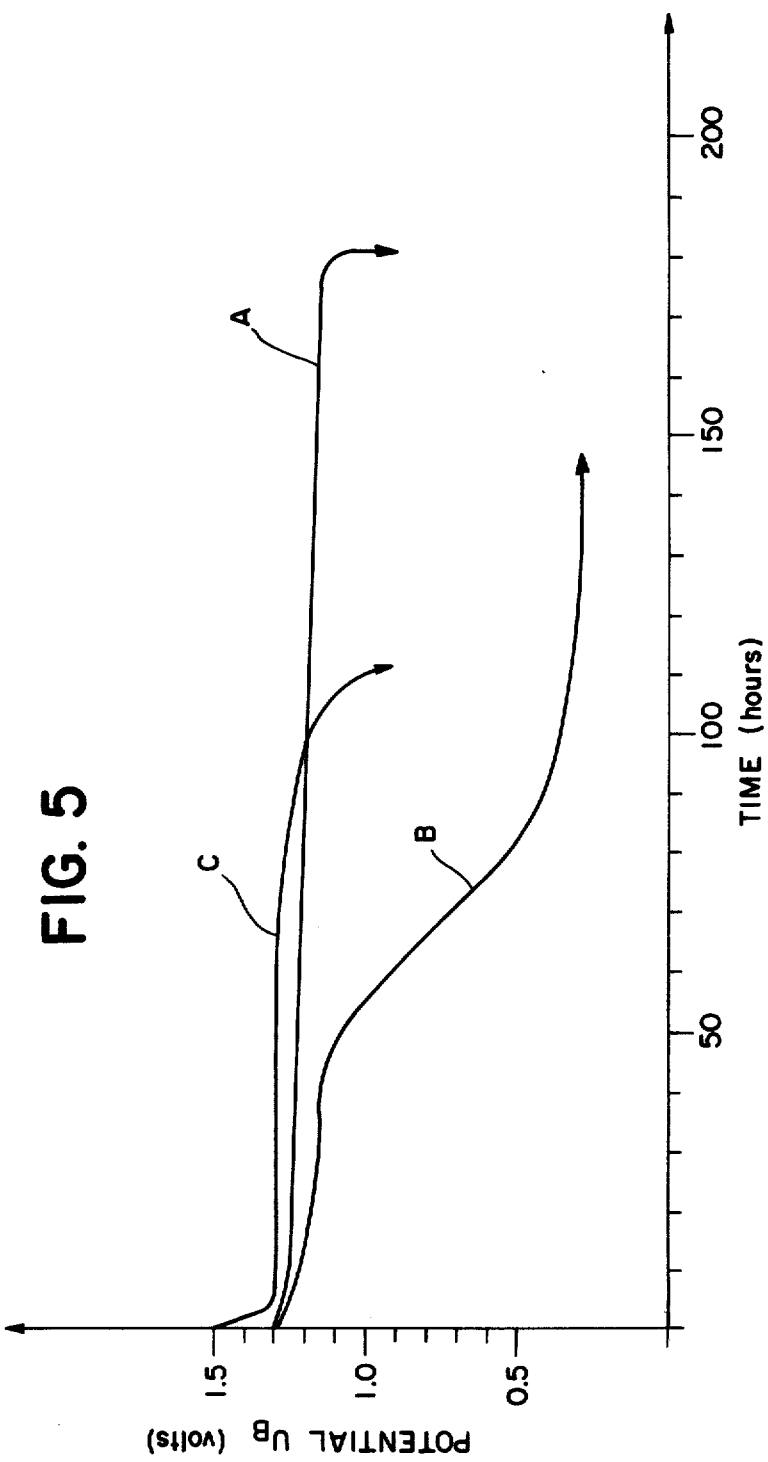

GALVANIC PRIMARY ELEMENT WITH AIR ELECTRODE

The invention relates to a galvanic primary element with alkaline electrolyte and hydrophobic air electrode. The latter is an electrolytic connection via a separation system with a negative electrode consisting of zinc powder. The negative electrode is positioned in a metallic cell cover and the positive electrode in a metal cell cup having an air inlet aperture. The cover is connected with the cup by means of a seal in electrolyte tight manner.

Since almost all chemical and electrochemical reactions involve a change in volume of the active mass, most electrochemical primary and secondary elements are provided with an expansion space or a corresponding elastic element, by means of which the changes in volume of the active mass and in some cases also of the filler are compensated.

Compensation for changes in volume can be dispensed with when this change of the components which react with each other is very small. Thus, the volume of the active mass of an HgO/Zn cell, for example, changes during discharge by only +3.5 percent by volume and that of an AgO/Zn cell only by −2.7 percent by volume. For button cells with gas tight closures of the HgO/Zn or AgO/Zn type no special structural precautions are needed to absorb volume changes. Rather these small volume changes are absorbed by the button cell housing, which is thereby caused to become negligibly thicker or thinner.

In contrast, the cell reactions which are accompanied by volume changes of more than 3 percent, additional precautions must be taken because the cell otherwise exceeds the permissible tolerances. As a consequence of an increase in volume, loss of cell sealing may occur, whereas decrease of the volume may lead to an increae of the internal resistance.

In open electromechanical systems, the reaction-caused volume change can easily be taken into account. As an example, in storage batteries the space above the electrodes serves as the expansion space. The reaction-caused volume change of the electrode manifests itself as a change in the electrolyte level of the cell. Nevertheless, gravity is effective to maintain the electrolyte in good electrical contact with the electrodes. In open primary systems, structure of this type are also known. There also include elements of the air/zinc type. This system is characterized by an especially pronounced, reaction-caused volume change. In alkaline air/zinc cells, oxidation of the zinc to zinc oxide causes a volume increase of about 62 percent. Such a volume increase must be accommodated in an air/zinc button cell system by means of a corresponding expansion space adjacent to the zinc electrode.

Alkaline air/zinc button cells are known in the most varied configurations. For example, in German Offenlegungsschrift No. 2,312,819, or British Pat. No. 1,319,780, the required expansion space is not provided. Cells of this construction are not reliable for the reasons described above.

In German Offenlegungsschrift No. 2,252,803 a button cell construction with a suitable expansion space is shown. The construction there described consists essentially of a plastic cup which contains the air electrode, the electrolyte and the zinc powder. The bottom is provided with air holes which are connected to the air electrode. The synthetic plastic cup is closed by a synthetic plastic lid equipped with the necessary compressible layer acting as the expansion space. This layer bears upon the zinc electrode through a contact screen. The contact screen itself is connected to a flexible wire which leads to the outside through the synthetic plastic cover.

Thus, the expansion space is positioned between the negative zinc electrode and the glued-on synthetic plastic cover. This requires a complicated take-off conductor which is undesirable, especially in mass production such as is employed particularly for primary elements. The required glued joints using epoxy resin are also ill suited to mass production of primary elements because of the required setting times.

The thin plastic housing of the cell has only low strength and, in particular, does not comply with IEC standards and can therefore not be used in commercial grade devices.

A special problem is presented by the passage of the contact to the negative electrode through the synthetic plastic cover. Such passages can be made electrolyte tight only with difficulty due to the different expansion coefficients of synthetic plastic and metal. Moreover, the cell configuration shown in this German Offenlegungsschrift has no protection against the possiblity of electrolyte leakage.

Accordingly, it is an object of the invention to provide a well functioning cell which, while taking into account, the necessary expansion space, also exhibits special advantages with respect to capacity, mechanical ability, leak-proofness, and shelf life.

It is another object to provide such a cell which, in addition to the specific structural configuration of this expansion space inside the button cell also has a behaviour under compression conforming to that of the other structural elements of the cell.

It is another object to provide such a cell whose housing corresponds to the requirements of the IEC standards. It is another object to provide such a cell whose construction is suitable for mass production.

It is another object to provide such a cell in which trouble free contact between electrode and cell housing is provided, despite the presence of an expansion space.

These objects and others which will appear are achieved in accordance with the invention by providing a compressible expansion body within the negative electrode.

This compressible expansion body may consist, for example, of a synthetic plastic material with closed pores, or preferably, it may take the form of threadlike, spherical or irregularly shaped particles which are mixed in with the zinc powder. In the construction of the cell, it is particularly important for the positive air electrode to be firmly attached to a hydrophobic layer, penetrably by air, through a latticed screen, that the edge portion of this layer be pressed in electrolyte-tight manner upon a shoulder of the cell cup, and that the specific compression pressure of the compressible expansion body be smaller than that of the remaining porous layers of the element.

Figure 2:
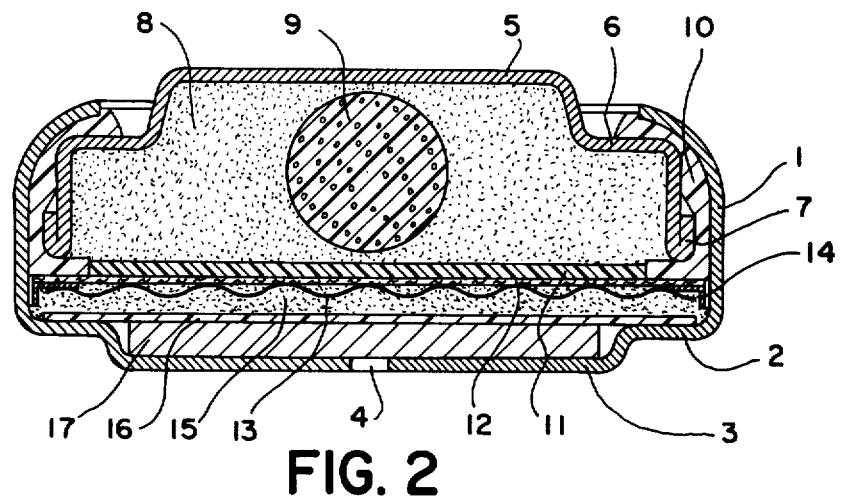
Figure 3:
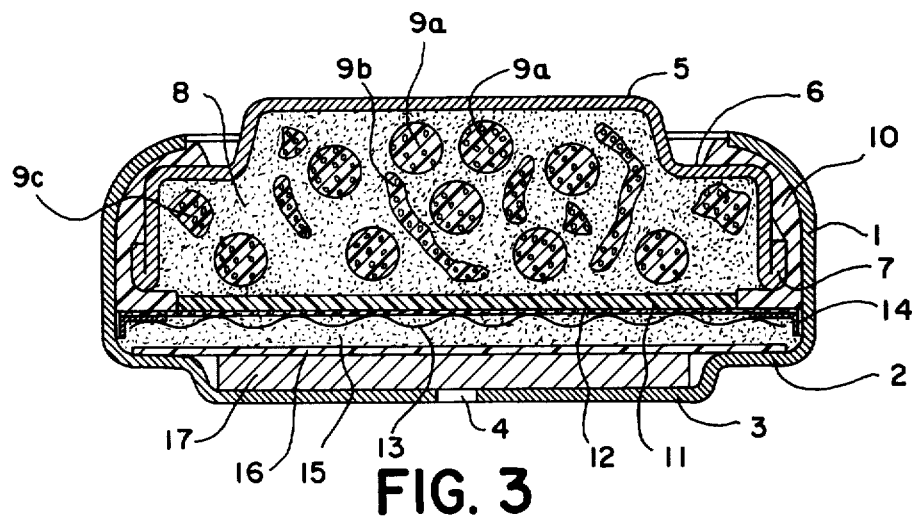

The invention is further described in the discussion which follows in the light of the accompanying figures wherein FIGS. 1 to 3 show cross-sections through various embodiments of air/zinc button cells embodying the invention.

Figure 4B:
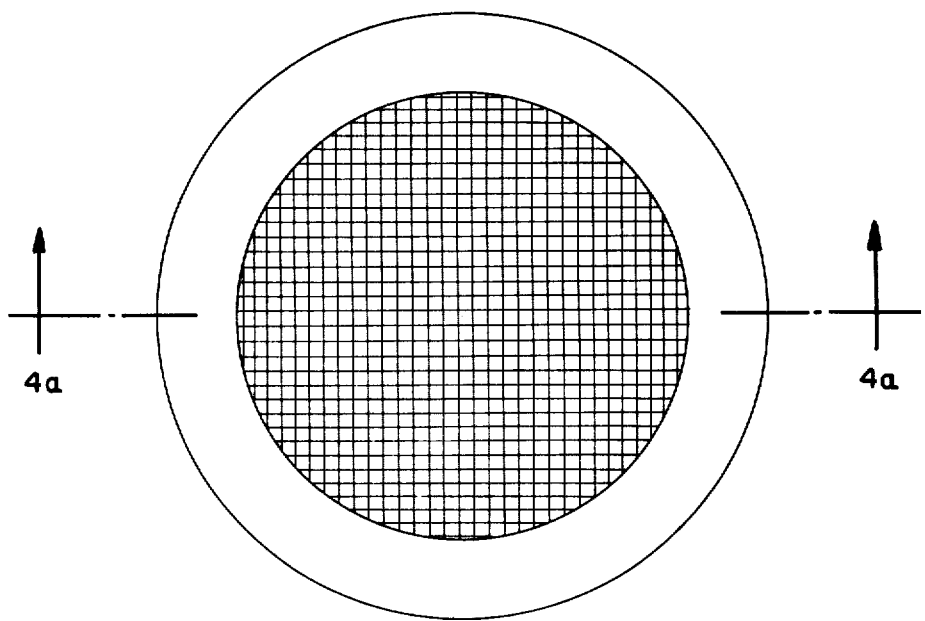

FIGS. 4b and 4a show in top view and in cross-section, respectively, the catalytically active layer; and FIG. 5 shows diagrams of pertinent discharge characteristics.

The same reference numerals are used in the different figures to denote similar elements.

The active components of the elements are positioned within the metal cup 1 having metal cover 5. These are joined to each other in electrolyte-tight manner in conventional fashion, by means of a synthetic plastic seal 10 and crimping. Inside cover 5 there is the negative electrode 8, i.e., the zinc powder provided with an alkaline electrolyte.

In accordance with the invention the compressible expansion body 9 is positioned within the zinc powder 8 in order to compensate for the reaction-produced volume increase of the zinc powder. In order for it to perform its function reliably, it is necessary that this body have closed compressible pores and it is preferable that it be hydrophobic.

In contact with zinc powder 8 there is the electrolyte diaphragm 11 which provides for electrolytic contact between the positive and negative electrodes. Next, there is the separator 12 which reduces the internal discharge of the air/zinc system and which prevents short circuiting.

The air electrode consists of a catalytically active layer 15 containing a metal screen 13 for current take-off which is in electrical contact with cup 1 via metal ring 14. Active layer 15 penetrates through metal screen 13.

On the side of the catalytically active layer facing the air inlet opening there is a porous hydrophobic layer 16. It is firmly attached to layer 15 by compression. The permeability coefficient of layer 16 should not be less than $1 \times 10^{-2}$ cm$^2$/($h \times$ cm WS)*, and not more than 1 cm$^2$/($h \times$ cm WS). In this way the air supply is not excessively impeded nor is the material exchange rate between the active cell and the ambient excessively high. In this manner, unnecessarily high inflow of $CO_2$ or exchange of $H_2O$ is prevented.

*, wherein cm WS is a pressure measured in centimeters of water column.

To achieve adequate adhesion between hydrophobic layer 16 and catalytically active layer 15 it is particularly desirable that layer 16 be pressed onto layer 15 by means of a corrugated plunger. This corrugation is visible in FIG. 4b. FIG. 4a shows the air electrode in cross-section. In addition to the grid shape of the corrugation which is illustrated, a pattering in the form of concentric circular grooves leads to particularly good adhesion.

An additional essential component of a cell in accordance with the invention is porous layer 17. This layer 17 serves both to distribute the air uniformly over the air electrode and to provide support for the relatively flexible air electrode composed of layers 13, 14 15 and 16. Admission of air to the cell takes place through hole 4 in the cell bottom 3. Through the corrugation which results from pressing of the porous hydrophobic layer 16 against the air electrode layer 15, alternating adjoining portions of this layer 16, which preferably consists of polytetrafluorethylene foil, are sealed tightly or loosely. The regions of tight sealing produce firm attachment of the foil to the catalytically active layer. The regions of light sealing, on the other hand, exhibit the necessary air permeability required to supply oxygen to the air electrode.

The expansion body 9 shown in FIG. 1 is of rectangular shape. However, an expansion body in the form of a compressible sphere as shown in FIG. 2 may also be used. It is particularly advantageous, as shown in FIG. 3, to make the compressible body of a plurality of compressible particles which may be sphere-shaped, thread-like or of irregular shape, as shown at 9a, 9b and 9c, respectively. In this way the expansion space is distributed uniform through the zinc powder and the swelling of the mass of the negative electrode is always compensated near the region in which it takes place.

An additional particularly preferable arrangement involves using hollow zinc spheres in place of zinc powder, with an internal void of between 50 to 65 percent by volume. In this way each zinc sphere has its own expansion space, making superfluous the incorporation of a compressible expansion body.

The placing of expansion bodies within the zinc electrode has the particular advantage that the entire inner surface of metallic cover 5 remains in electrical contact with the negative electrode formed of zinc powder. This makes the negative electrode have very low ohmic resistance. In addition the expansion body makes unnecessary the use of excessively high compressional forces during closing of the cell. This also reduces the danger of electrolyte escape during the crimping process.

An additional important characteristic of the cell construction stems from the fact that cell cup 1 is so shaped as to exhibit a shoulder 2 which bears the closing force which is transferred during the crimping process via shoulder 6 of cover 5 to the seal 10 and then to the edge portion of the structural elements of the cell. Under the influence of this closing force, an electrolyte-tight seal is produced between the edge portion of hydrophobic layer 16 and shoulder 2 so that electrolyte cannot penetrate into porous layer 16. Shoulder 2 also provides additional mechanical stability for cup 1. It is also possible to press into shoulder 2 concentrically arranged grooves which further improve the seal between layer 16 and shoulder 2. Layer 17 performs primarily an air distribution and support function. In the event that electrolyte escapes due to a structural defect within layer 16, the porous layer 17 can catch the outflowing electrolyte in its pore system. Under these circumstances, air supply to the positive electrode is inhibited and the cell is rendered inoperative. However, the danger of electrolyte escape through air hole 4 is thereby greatly reduced.

To insure trouble free operation of the cell, it is necessary to coordinate the compressibility, i.e., porosity of the individual structural elements of the cell, Otherwise, it may happen that the air supply is increasingly impeded in the course as the discharge progresses. This is avoided by selection of a body of suitable compressiblity. In addition, the expansion body has the important task of exerting mechanical pressure upon the zinc powder so that the electrical contact resistance at cover 5 and the electrolyte contact resistance at the diaphragm-separator system 11, 12 is not too high at the start of discharge. On the other hand, the mechanical pressure of expansion body 9 must not be too high, otherwise, there is the danger that the air electrode becomes deformed in the direction of the cup bottom 3 in the course of discharge. In that event, the air electrode, as well as possibly layer 17 could be so strongly pressed together that the resulting inadequate porosity would impede the air supply. This could lead to loss of cell voltage even at low discharge current.

The compressiblity of expansion body 9 as well as of layers 15, 16 and 17 can be defined in terms of the specific compression pressure P* as follows:

$$P^* = V_o \times \frac{\Delta P}{\Delta V}$$

where
$V_o$ is the initial volume of the body
$\Delta P$ is the change in pressure experienced
$\Delta V$ is the resulting change in volume The pressure P* varies for different compressible bodies and is defined in terms of equal relative volume change. For a well-performing cell, it must be as follows:

$$P^* (9) < P^* (17) \leq P^* (16) \leq P^* (15).$$

Thus, the specific compression pressure of expansion body 9 must be lower than the specific compression pressure of layers 17, 16 and 15, the layer 15, which is the catalytic layer, having the highest compression pressure. As a result, sufficient contact pressure exists at the start of discharge. During the course of the discharge, the contact pressure inside the cell steadily rises so that the reaction-caused increase of polarization is partially compensated by a decrease of the contact resistance. Thus, for a given load, particularly great potential stability of the cells results as a function of discharge time. At a current density of about 4mA/cm² cells of this type have an energy content which is about 40 percent higher than that of HgO/Zn cells of the same size.

To prevent material exchange during storage and particularly to prevent water exchange and $CO_2$ intake by the cell, as well as to prevent internal discharge, the air hole may be closed by an adhesive foil which is removed only shortly before the cell is used.

In the manufacture of a button cell according to the invention, the housing components may be made of nickel plated steel sheet. The cell cover, particularly, may consist of a material having a 3-layer construction of copper in the middle and nickel on the outside. The cell cup has a deformation 3 which provides shoulder 2. The outer dimensions conform to the IEC standards.

The catalytically active mass 15 consists of a mixture of polytetrafluorethylene powder and activated carbon which is catalyzed with silver. Into this active mass there is pressed an expanded metal screen, e.g. of nickel or silver, with a very open cross-section. The porosity of the catalytically active layer 15 should be about 50 percent. Thereafter, the polytetrafluorethylene foil 16 is firmly attached to the catalytically active layer 15 by means of a corrugated plunger. However, it is desirable that the edge portion 16 a (See FIG. 4), which must be sealed in electrolyte-tight manner to shoulder 2 of cup 1, does not have any corrugation.

Layer 11 may be an unsintered polytetrafluorethylene foil of about 200 microns thickness and with a porosity of about 40 percent. Its specific compression pressure is between about 3 and 10 kp/cm² and it has a coefficient of permeability of about 2 to 8 cm²/($h \times$ cm WS), and preferably of about 4 to 6 cm²/($h \times$ cm WS).

These components are joined into an air electrode having a thickness of about 0.5 millimeters. The adjacent porous layer 17 has a thickness of about 0.1 and 0.2 millimeters. It consists of a coarse absorptive material, preferably paper, with a compressibility of about 1 to 5 kp/cm² and preferably about 3 kp/cm². Before mounting of the air electrode, layer 17 is first placed on the bottom of cup 1. Then the air electrode and contact ring 14 are inserted and are pressed into cup 1 under a high pressure of about 0.1 to about 0.3 tons. A polypropylene separator of about 0.05 millimeter thickness is placed upon the pressed-in air electrode.

As the negative half of the cell, there is used as active material zinc powder having a grain density of about 3.5 to 4 grams per cubic centimeter and an additive of about 3 to 8 percent by weight mercury. This inhibits the hydrogen evolution upon addition of electrolyte. In a cell with dimensions of about 5.3 millimeters and a diameter of about 11.6 millimeters, about 500 milligrams of amalgamated zinc powder are used to which are added about 40 to 60 microliters of foamed polystyrol, having a compressibility between 0.1 and 0.3 kp/cm². This material is preferably mixed in in the form of small particles with a diameter of about 1 millimeter. The specific compression pressure of this material increases with decreasing porosity, such as occurs during discharge, up to values of about 3 kp/cm². These ingredients are then mixed with the alkaline electrolyte, e.g., KOH, and inserted in the cell cover 5. Upon this mass there is placed a mat which is both absorptive and capable of rendering its contents and which has sufficient stability in caustic ambient. Thereafter the positive and negative cell halves are joined using a synthetic plastic seal preferably a polyamide seal 10, and are permanently joined by crimping.

The discharge diagram of a cell embodying the invention (having a capacity of about 330 mAh) is shown in curve A of FIG. 5. The cell was loaded twelve hours per day, 7 days per week with a resistance of 625 Ω. After a period of more than 170 operating hours, the discharge potential $U_B$ decreases markedly. Curve B shows, for comparison, the load curve of an air/zinc cell without an expansion space embodying the invention. Here a marked decrease of the discharge potential is discernible after only 40 to 50 operating hours. Curve C shows, for comparison, the discharge diagram of a HgO/Zn cell (having a capacity of about 220 mAh), in which a pronounced potential drop takes place after 90 to 100 operating hours. A significant advantage of cells embodying the invention is the pronounced stability of the discharge potential over a operating period of 170 hours. The discharge characteristic is comparatively steady.

We claim:

1. A primary element with alkaline electrolyte and a hydrophobic air electrode which is electrolytically connected via a separator system to an electrolyte-containing negative electrode that includes zinc powder, the negative electrode being positioned in a metal cell cover and the positive electrode being positioned in a metal cell cup provided with an air inlet opening, and the cover and cup being sealed electrolyte-tight to each other, the element being characterized by
   a compressible expansion-absorbing body positioned within the negative electrode and surrounded by zinc in direct contact with the metal cell cover, and
   a hydrophobic air permeable layer attached to the air electrode.

2. The element of claim 1 wherein the compressible expansion body comprises a porous synthetic plastic with closed pores having a pore volume of about 80 to 98 percent.

3. The element of claim 2 wherein the compressible expansion body is in the form of particles having an average diameter of about 0.3 to 3 millimeters, these particles being mixed in with and distributed generally throughout the zinc powder.

4. The element of claim 1 wherein
the positive air electrode is firmly attached through corrugations to the hydrophobic air permeable layer,
the edge portion of the layer is pressed onto a shoulder in the cell cup, and
the specific compression pressure of the compressible expansion body is lower than that of the other porous layers of the element.

5. The element of claim 2 wherein the pore volume of the compressible expansion body amounts to about 50 to 65 percent of the zinc powder volume and its specific compression pressure lies between about 0.2 and 4 kp/cm$^2$.

6. The element of claim 4 wherein the shoulder serving as sealing surface of the cell cup has in it concentric grooves.

7. The element of claim 4 wherein
the open cross-section for air intake amounts to about 0.15 to 0.25 mm$^2$/10mA of cell current, and
the coefficient of air permeability of the hydrophobic layers lies between about $10^{-2}$ cm$^2$/($h \times$ cm WS) and 1 cm$^2$/($h \times$ cmWS).

8. The element of claim 1 wherein the cell cup is provided with a recess containing a porous, hydrophylic layer with a coefficient of air permeability between about 50 and 500 cm$^2$/($h \times$ cm WS).

9. The element of claim 1 wherein the compressible expansion body is formed of hollow zinc particles.

10. The element of claim 3 wherein the particles are of generally spherical shape.

11. The element of claim 3 wherein the particles include fiber shaped particles.

12. The element of claim 3 wherein the particles have irregular shapes.

13. The element of claim 4 further having a porous air distribution layer, the specific compression pressures P* of the compressible expansion body, of the air distribution layer, of the porous hydrophobic layer and of the positive air electrode being related as shown below:

$$P^* \text{(expansion body)} < P^* \text{(air distribution layer)} \leq P^* \text{(porous hydrophobic layer)} \leq P^* \text{(positive air electrode)}$$

14. The element of claim 1 wherein the expansion-absorbing body is a synthetic plastic foam.

15. The element of claim 14 wherein the foam is foamed polystyrol.

16. The element of claim 15 wherein the polystyrol is in the form of distributed particles with a diameter of about 1 millimeter.

* * * * *